United States Patent [19]

DeMarco

[11] Patent Number: 4,790,865
[45] Date of Patent: Dec. 13, 1988

[54] TWO COMPARTMENT INDUSTRIAL DUST COLLECTOR

[76] Inventor: Thomas DeMarco, 5815 N. Cicero Ave., Chicago, Ill. 60646

[21] Appl. No.: 116,875

[22] Filed: Nov. 5, 1987

Related U.S. Application Data

[63] Continuation-in-part of Ser. No. 868,695, May 30, 1986, Pat. No. 4,718,924.

[51] Int. Cl.⁴ .............................................. B01D 46/02
[52] U.S. Cl. ....................................... 55/337; 55/345; 55/398
[58] Field of Search ................. 55/302, 337, 345–349, 55/467, 468, 398, 442, 429, 304, DIG. 3

[56] References Cited

U.S. PATENT DOCUMENTS

| | | | |
|---|---|---|---|
| 3,780,502 | 12/1973 | Dupre et a. | 55/337 |
| 3,870,489 | 3/1975 | Shaddock | 55/337 X |
| 4,224,043 | 9/1980 | Dupre | 55/429 X |
| 4,328,014 | 5/1982 | Burgoon et al. | 55/304 X |
| 4,475,934 | 10/1984 | Kordas | 55/302 |
| 4,504,292 | 3/1985 | Vohringer | 55/337 X |
| 4,559,067 | 12/1985 | Durston | 55/468 X |

OTHER PUBLICATIONS

"Hi Vac", National Foundry Equipment Co. publication.

Primary Examiner—Charles Hart
Attorney, Agent, or Firm—Jeffrey M. Morris

[57] ABSTRACT

A specially arranged two compartment, industrial dust collector is provided which is efficient, effective, and economical. The first compartment has a lower cyclone chamber which contains a cyclone. The second compartment has a central chamber which contains at least one filter to filter the remaining particulates of dust.

11 Claims, 6 Drawing Sheets

FIG_1

FIG_4

FIG_5

FIG_7_

FIG_8_

TWO COMPARTMENT INDUSTRIAL DUST COLLECTOR

RELATED APPLICATION

This patent application is a continuation-in-part of the allowed patent application of Thomas M. DeMarco for a Two Compartment Four Stage Industrial Dust Collector, Ser. No. 868,695, filed May 30, 1986, U.S. Pat. No. 4,718,924 in Group Art Unit 135, before Examiner C. Hart.

BACKGROUND OF THE INVENTION

This invention pertains to machines for removing dry and wet liquid particulates, and more particularly, to a vacuum cleaner loader or conveyor.

In industry, voluminous amounts of particulate matter, debris, and waste are emitted during machining, foundry, milling, shipment, warehousing, assembling, fabricating, and other manufacturing operations. Particulates of dust emitted during a manufacturing operation can include metal slivers, plastic chips, wood shavings, dirt, sand, and other debris. Dust accumulates on floors, machines, packaging materials, equipment, food and personnel. Dust is carried and circulated in the air and can be injurious to the health and safety of operating personnel and other on site employees. Dust can damage, erode, and adversely effect the efficiency and operability of equipment. It can also create a fire hazard and cause explosions in some situations, such as in grain elevators. Voluminous amounts of dust can pollute the atmosphere. Dust may also impair the quality of the products manufactured.

Dust emissions are not only dangerous and troublesome, but are particularly aggravating and grievous where relatively dust-free conditions and sterile environments are required, such as in medical supply houses, the electronics industry, and in food-processing plants.

Over the years a variety of industrial dust collectors and other equipment have been suggested for removing industrial dust and debris and for other purposes. Typifying these industrial dust collectors and equipment are those found in U.S. Pat. Nos. 485,915, 795,412, 2,276,805, 2,372,316, 2,496,180, 2,604,956, 2,720,278, 3,320,727, 3,485,671, 3,541,631, 3,554,520, 3,577,705, 3,608,283, 3,650,420, 3,653,190, 3,717,901, 3,731,464, 3,780,502, 3,842,461, 3,877,902, 3,951,623, 3,955,236, 3,970,489, 4,007,026, 4,032,424, 4,036,614, 4,062,664, 4,099,937, 4,111,670, 4,174,206, 4,224,043, 4,272,254, 4,443,235, and 4,504,292. These prior art dust collectors and equipment have met with varying degrees of success.

It is, therefore, desirable to provide an improved industrial dust collector which overcomes most, if not all, of the preceding problems.

SUMMARY OF THE INVENTION

An improved two compartment industrial dust collector is provided to remove particulate matter, debris and waste from industrial plants and other locations. Advantageously, the novel industrial dust collector is efficient, effective and safe. It can also be portable and accommodate standard size bins and hoppers.

To this end, the novel two compartment industrial dust collector is provided with a first compartment comprising a solids-gas separation compartment to remove larger particulates of dust and a second compartment comprising a filtering compartment to substantially remove the remaining particulates of dust. The solids-gas separation compartment preferably has a lower cyclone chamber containing a tangential cyclone. In one embodiment, the solids-gas separation compartment also has an overhead deflector in the form of a spiral baffle. In another embodiment, the solids-gas separation compartment further has an overhead deflector in the form of parallel annular baffles or rings. For some types of dust and other particulates, it may be desirable to use a solids-gas separation compartment with a tangential cyclone but without an overhead deflector, such as shown in another embodiment.

The filtering compartment has a filtering chamber containing at least one filter, such as a Hepa-type filter or a box type filter or a set of 2 to 4 canisters with tubular filters therein, and has an acceleration or kinetic energy chamber to accelerate and/or pass the dusty gas stream with sufficient kinetic energy to remove a substantial amount of particulate of dust from the dusty gas stream before the dusty gas stream enters and passes through the filter(s). The filtering compartment 10 can have nozzle, tubes, or ports, to inject the dusty gas stream into the acceleration chamber. One or more air injectors, shakers, vibrators, or other filter cleaning devices can be provided to periodically clean the filters. In the preferred from, the filtering chamber has a power-operated discharge door to discharge the dust into the bin or hopper.

As used in this Patent Application, the term "dust" means particulate matter, debris and waste.

The terms "dedust" and "dedusted" as used herein means removing a substantial amount of dust.

A more detailed explanation of the invention is provided in the following description and appended claims taken in conjunction with the accompanying drawings.

DETAILED DESCRIPTION OF THE PREFERRED EMBODIMENTS

Figure 1:
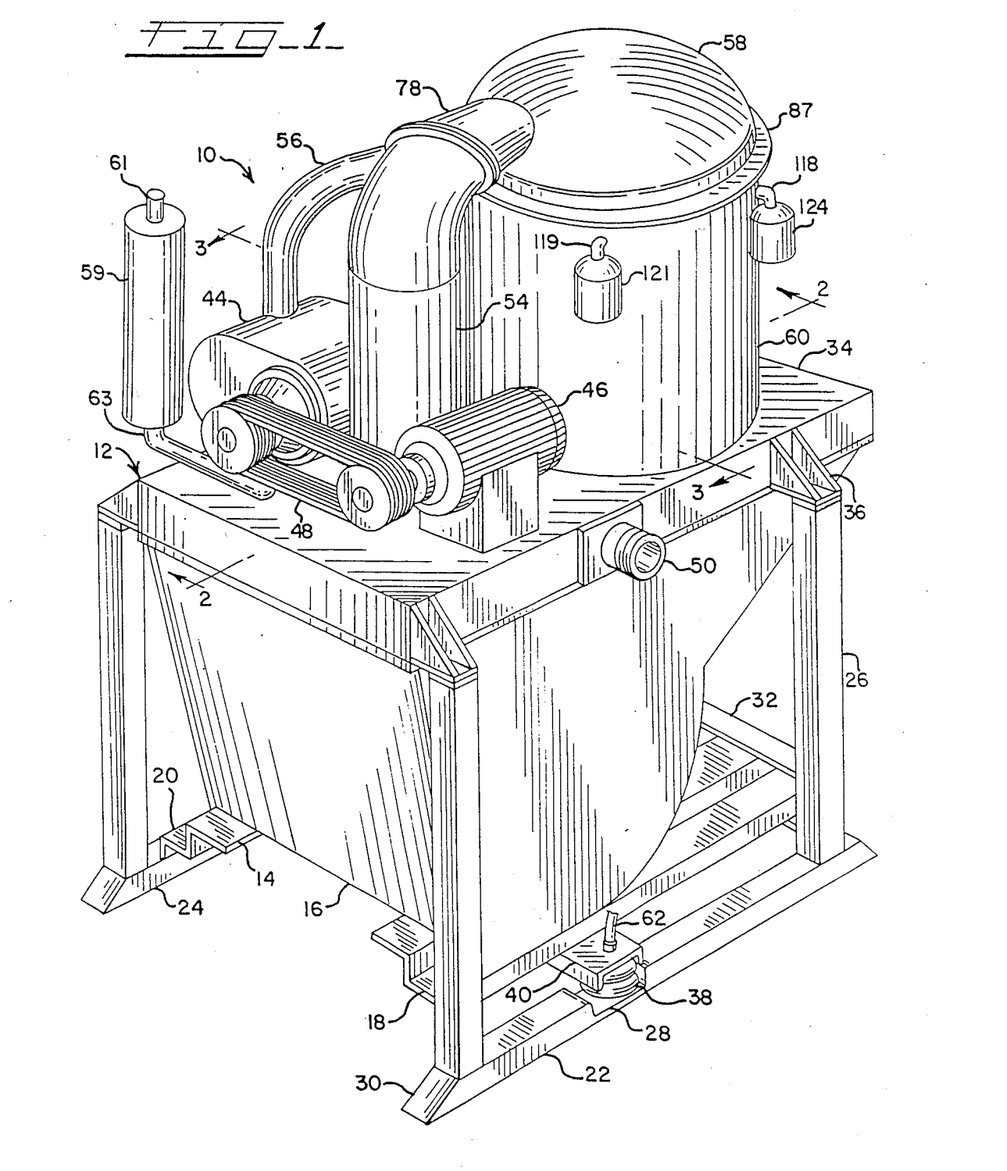
FIG. 1 is a perspective view of a two compartment industrial dust collector in accordance with principles of the present invention.

Referring to FIG. 1, a two compartment, four stage, industrial dust collector 10 provides a heavy-duty vacuum-operated machine for efficiently removing, effectively collecting, and safely disposing of particulate matter, debris, and waste. The industrial dust collector can be made of steel or other metal. Other materials can be used.

The industrial dust collector 10 has a frame assembly 12 which provides a cradle 14 for receiving a bin or hopper 16 such as a standard 27 cubic foot, end dump hopper. The frame assembly and hopper can be equipped with forklift-channels 18 and 20 for receiving and being moved by tines of a forklift truck. The frame assembly has support members or skids 22 and 24 which provide a base and four vertical posts 26 which are securely connected to and extend upwardly from the ends or corners of the base. The support members are parallel, extend horizontally and laterally, and have a bellow-support pad 28 and feet 30. A transverse support bar 32 extends between the posts. An upper, horizontal support platform 34 with support arms 36 is securely connected to, positioned upon, and extends laterally between the tops of the posts. Pneumatically-operated expansion bellows 38 are positioned on the bellows support pads of the base, near the posts and under a bellows-raisable channel and transverse bar 40 under the bin, to move the top of the bin flush into sealing engagement against a gasket or seal 42 (FIGS. 2 and 3) on the underside of the support platform. Wheels or casters (not shown) can be mounted on the underside of the base to enable the frame assembly to be mobile and portable.

An air blower, vacuum pump, compressor, turbine, or fan 44 (FIG. 1) and motor 46 are mounted on a support surface, such as the support platform. The air blower is operatively connected to and driven by the motor by drive belts 48. The air blower (vacuum pump) creates a vacuum (suction) to draw dust and direct influent dusty air (air laden with particulates of dust) through an inlet conduit 50 into a first compartment, also referred to as a solids-gas separation compartment, which comprises two stages: a first or tangential cyclone stage 52 and a second, deflector, or solids-gas separation stack stage 65. The cyclone stage comprises a relatively short cylinder and the stack stage comprises a relatively elongated 4-cylinder. The air blower inlet is connected by an overhead blower line and outlet conduit 56 (FIG. 1) to outlet 114 of the upper chamber of the filtering compartment 60. The air lift bellows 38 are activated by means of a manually operated hand valve with compressed air being supplied for inflation from an external source or a separate optional air compressor mounted on the frame assembly 12. A muffler 59 with an overhead discharge outlet 61 is connected to the air blower by a blower-discharge conduit 63. An automatic shutoff control panel (not shown) can be mounted on the support platform and connected to a sensor and limit switch in the bin to automatically shut off the air blower or motor when the discharged collected dust in the bin has reached a preselected level. A flexible, elongated intake hose, with an optional nozzle, can be connected to the intake conduit 50 to facilitate collection of the particulate material.

The solids-gas separation compartment 54 (FIG. 2) provides two stages of separation: a lower chamber comprising a first cyclone-stage 64 and an upper chamber comprising a second deflector stage 65. The lower chamber contains a tangential cyclone 52 with an open bottom or bottom outlet 66 for discharging larger particulates into the bin 16 and an open top or top outlet 67 for discharging the remaining entrained particulates and air into the upper chamber. The upper chamber provides an upper deflector section with a cylindrical upright wall 68. A spiral or helical baffle 69 spirals upwardly in the upper chamber (upper stage). The spiral baffle extends above and cooperates with the tangential cyclone to make a gross cut and remove the larger particulates of dust so as to partially dedust the influent dusty air. It has been unexpectedly and surprisingly found that the spiral baffle removes a greater amount of large particulates of dust than just a cyclone alone. Indeed, a large amount of particulates collect on the bottom side of the baffle.

Figures 4, 5:
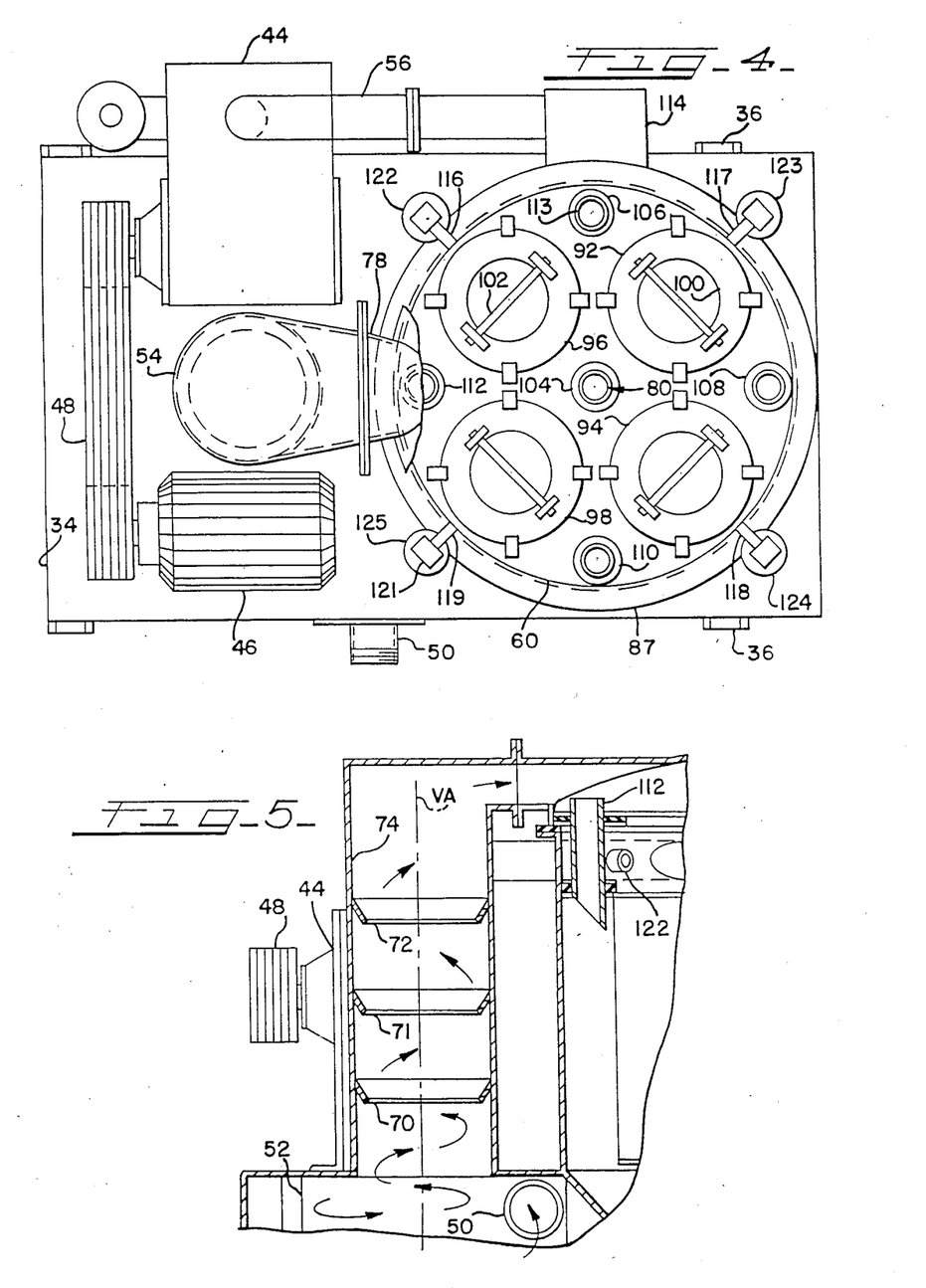
FIG. 4 is a top view of the two compartment industrial dust collector.
FIG. 5 is a fragmentary cross-sectional view of another two compartment industrial dust collector in accordance with principles of the present invention, with rings or annular baffles in the upper deflector compartment of the solids-gas separation chamber.

In the embodiment of FIG. 5, parallel horizontal rings 70, 71, and 72 which define a set of annular interrupting baffles are concentrically positioned about the vertical axis VA of the upper deflector section (upper second stage) 74 of the solids-gas separation compartment above the tangential cyclone 52, instead of or in combination with the spiral baffle, to make a gross cut and remove larger particles of dust so as to partially dedust the influent dusty air. The rings can be connected to the walls of the chamber and can be connected and spaced from each other by rods. It has been unexpectedly and surprisingly found that the rings or annular baffles are almost as good as the spiral baffle.

The partially dedusted air exits the first compartment through an outlet 76 (FIG. 2) near the top of the first compartment. An intermediate conduit and passageway 78 (FIGS. 1, 2, and 4) is connected to and communicates with the outlet 76 to the second compartment (filtering compartment) 60 to the overhead array of downwardly facing ports, slots, tubes, or nozzles 80 within the dome 131 which is in the filtering compartment 60 for passing, conveying, and injecting the partially dedusted air into the lower filter chamber below.

The second compartment 60 (FIG. 2), which is sometimes referred to as the filter compartment or the filtering compartment, provides two filter stages; a third and fourth stage. The second compartment comprises a chamber with a cylindrical upright wall 82 and a slanted frustoconical, annular lower wall portion 84 extending downwardly from the upright wall to provide a discharge opening and chute into the bin 16. The second compartment has a horizontal floor comprising a normally closed, power-operated, horizontal discharge hatch, flap or door 86 which is mounted on rollers 88 (FIG. 3) and connected by suitable air or hydraulic cylinders powered by an external compressed air tank or a hydraulic pump. In the preferred embodiment, the door (hatch) is horizontal for best results, although in some circumstances it may be desirable to use one or more doors or hatches which are at an angle of inclination. The domed roof or top 58 of the second stage filter chamber has an outwardly extending, circular flange 87.

Figure 2:
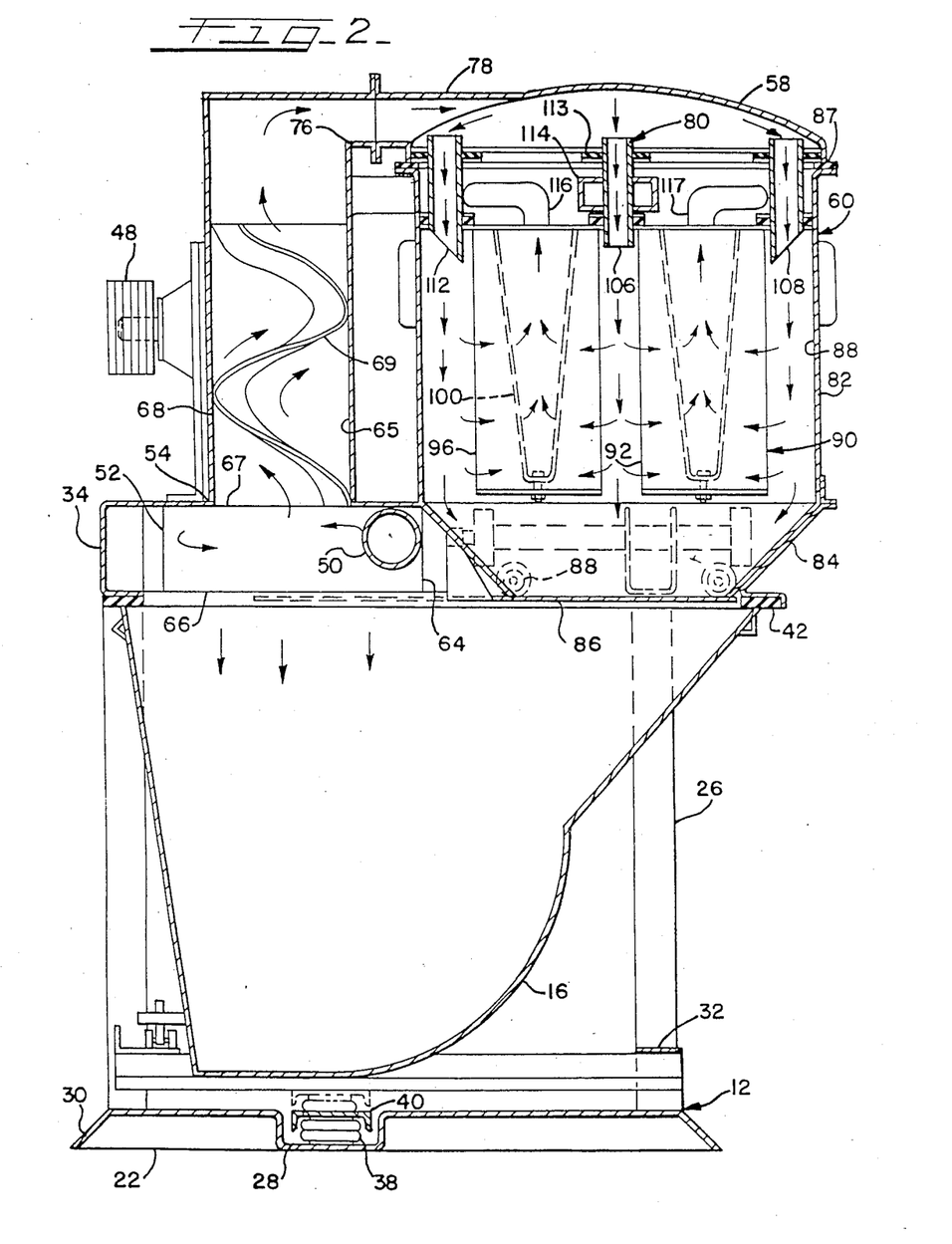
FIG. 2 is a cross-sectional front view of the two compartment industrial dust collector taken substantially along lines 2—2 of FIG. 1.
Figure 3:
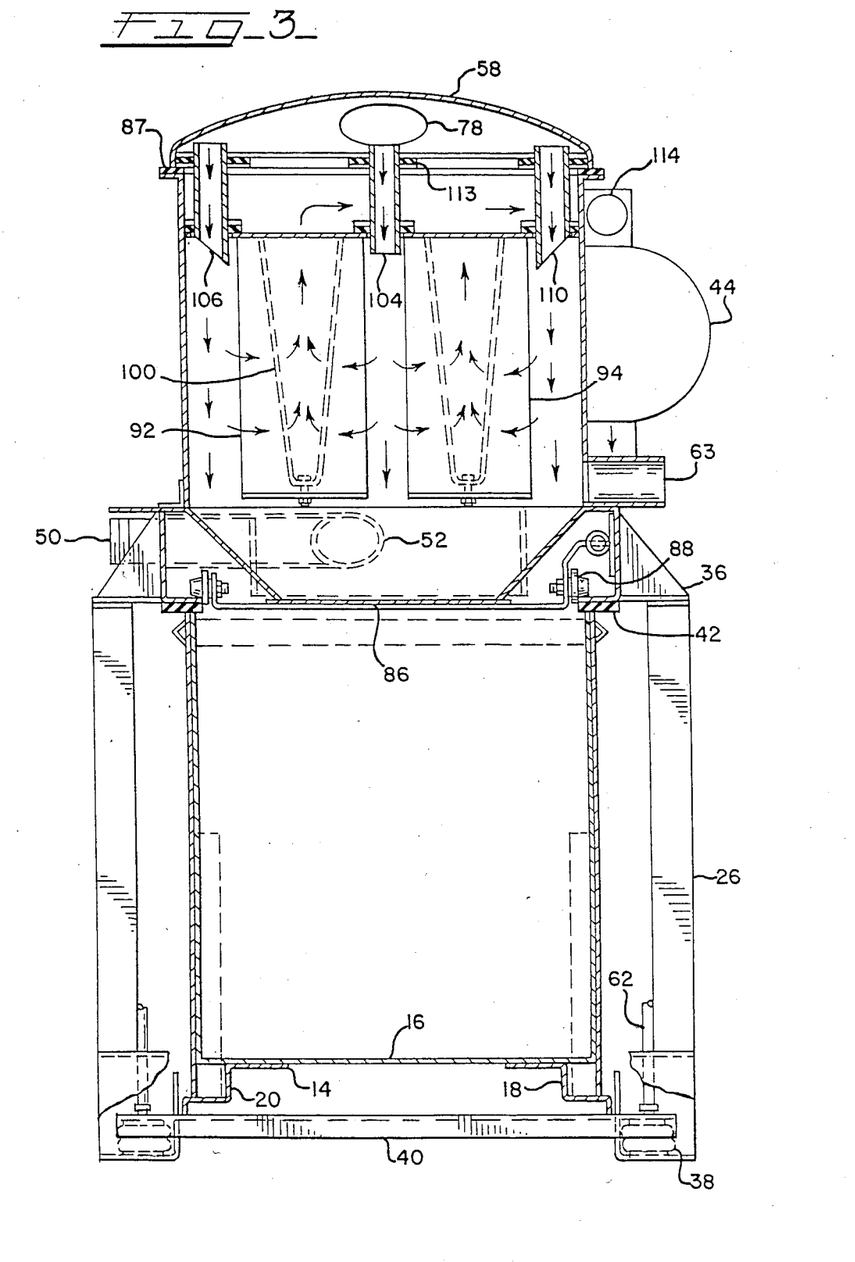
FIG. 3 is a cross-sectional side view of the two compartment industrial dust collector taken substantially along lines 3—3 of FIG. 1.

Upper acceleration chamber or kinetic energy chamber 131 comprises a plurality of downwardly facing nozzles 80 for downward air flow to remove particulates of dust by kinetic energy and lower filter chamber 89 comprises a plurality of canister filters 90 for annular and lateral air flow to each filter to remove substantially all the remaining particulates of dust. It has been unexpectedly and surprisingly found that the third or nozzle stage and kinetic energy chamber of the second compartment produces superior downward distribution and partial dedusting of the dusty air by virtue of the kinetic energy of the particulates as they leave the nozzles while the cleaner air is drawn laterally into the adjacent filters.

As previously mentioned, the fourth or canister filter stage contains a set of two, and preferably four, filter-canisters 92, 94, 96, and 98 (FIG. 4) which are positioned in a circular array with compartment 60. Each of the canisters contains a vertically V-shaped retainer 102. While the preceding arrangement is preferred for best results, more or less filters can be used, if desired.

As shown in FIG. 4, the downwardly facing overhead nozzles 80 include a central nozzle 104, positioned in the center of the dome along the vertical axis of the filter chamber, and a circular set, array, or series of four nozzles 106, 108, 110, and 112, which radially and circumferentially surround the central nozzles. While the above arrangement of nozzles are preferred for best results, a different arrangement of nozzles, or more or less nozzles or ports can be used, if desired. The nozzles are fluidly sealed by O-rings or seals 113. The downwardly facing overhead nozzles are arranged to cooperate with each other to direct the partially dedusted air downwardly in a downwardly annular flow pattern about the outside of the filters, so that the cleaner air will pass laterally and inwardly through the filters while the particulates maintain a downwardly flow due to kinetic energy impartmed to them for settlement on the door 86. The filtered air is deflected and drawn upwardly through the centers 130 of the filters through to the clean air chamber 132. The filters removes the fines (minute fine dust particles) and substantially all the remaining particulates of dust in the dusty air stream to produce a dedusted purified air stream.

A discharge outlet conduit 114 is connected to and communicates with the clean air chamber (plenum) 132 of the filtering compartment 60 and conduit 56 to provide an outlet and passageway through which the purified, dedusted and filtered air is drawn into the vacuum suction pump (air blower) and muffler for discharge to the atmosphere or area surrounding the collector.

Reverse pulse filter cleaners comprising air injectors 116-119 (FIGS. 2 and 4) can be mounted and extend to the interior of the air chamber 132 with conduit nozzles 116, 117, 118, and 119 extending to the center of each respective filter to periodically inject intermittent blasts of clean air upon the inside of the filters to help clean the filters. The injectors are connected by pneumatic tubes or conduits to an air supply source, such as compressed air canisters, compressed air tanks, or an auxiliary compressor. In the illustrative embodiment, there is a circular array of four compressd air canisters 122-125 mounted about the exterior surface of the cylindrical upright wall of the filtering compartment 60 and there is a circular set or array of four downwardly facing, overhead air injectors 116-119 positioned above the center of the filters and connected to the compressed air canisters to sequentially inject pulses of compressed air into the center of the tubular filters to shake loose the dust collected, accumulated, or the outside of the filter walls. More or less air injectors and compressed air canisters can be used. While the illustrated arrangement is preferred for best results, a different shaped array of air injectors and/or air canisters can be used, if desired.

The removed dust collected and accumulated on the bottom of the filtering compartment is discharged into the bin or first compartment when the blower is turned off and the discharge door is opened, as indicated in dotted phantom line in FIG. 2.

In operation, air laden with entrained particulates of debris, waste and other dust is drawn by the blower through the intake conduit 50 into the tangential cyclone 52 in the lower chamber of the solids-gas separation chamber. The cyclone swirls the dusty air tangentially along the inside surface of the chamber and ejects the effluent air upwardly through the upper deflector chamber of the solids-gas separation compartment. In the upper deflector chamber of the solids-gas separation compartment, the spiral baffles or rings will catch the dusty air along its bottom surface which flows in an upward spiral or radial flow pattern to outlet 76. The baffle or rings cooperates with the cyclone to remove the larger particulates of dust and substantially decrease the concentration of dust in the air stream. The removed particulates are discharged by gravity downwardly into the bin 16 through the bottom outlet 66 of the cyclone.

The partially dedusted air stream is then passed laterally through the intermediate conduit 78 to the domed upper chamber 131 of the filtering compartment, having domed top 58, and is injected forcefully downwardly by the nozzles or ports to the annular lower chamber of the filtering compartment 60 about the outside surface of the tubular filters 92, 94, 96, and 98. The cleaner air is then passed laterally and downwardly through the filters and deflected upwardly through centers of the tubular filters for discharge through the outlet of the filtering compartment. The filters removes the fines and substantially all of the remaining particulates of dust to produce a substantially dust-free air stream. The filtered air is drawn into the vacuum suction pump (air blower) 44 and the muffler 59 for safe discharge to the surrounding area, environment, or atmosphere.

Figure 6:
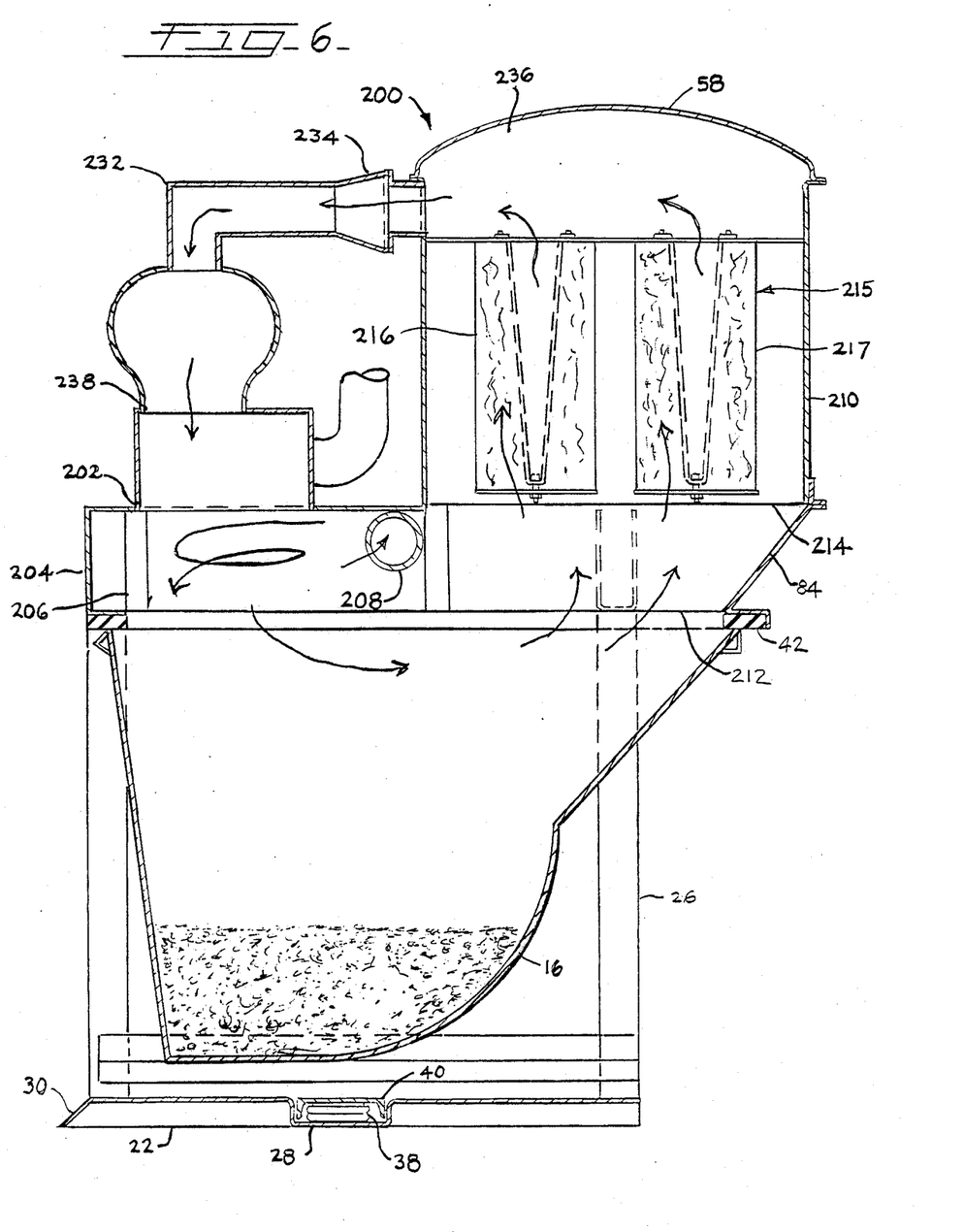
FIG. 6 is a cross-sectional front view of a further two compartment industrial dust collector in accordance with principles of the present invention.
Figure 7:
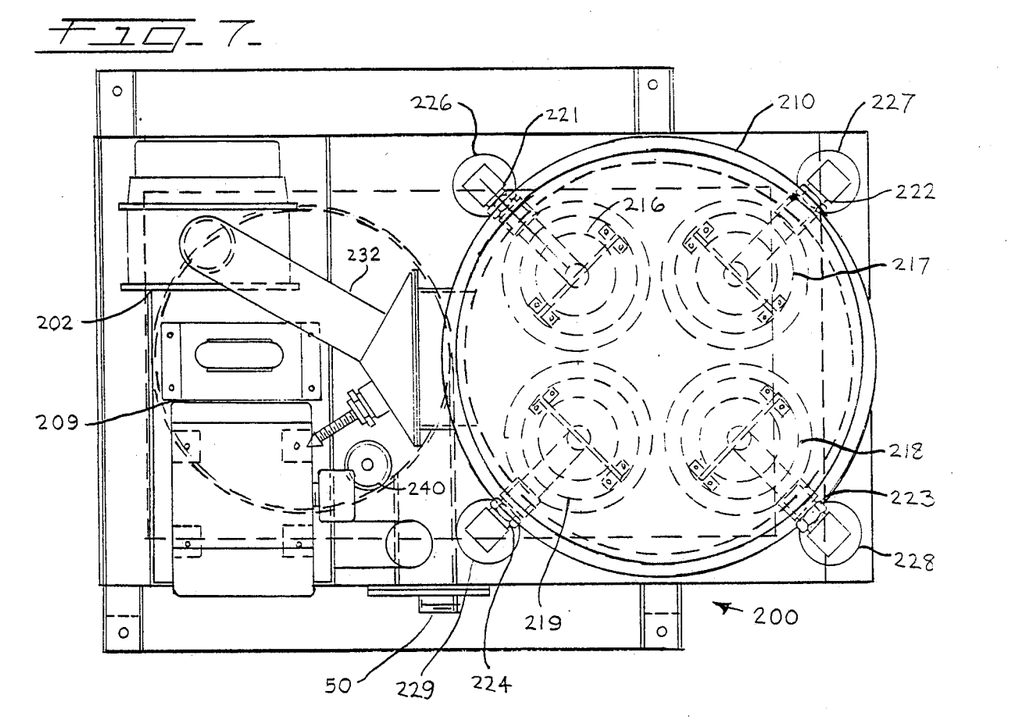
FIG. 7 is a top view of the two compartment industrial dust collector of FIG. 6.

The two compartment industrial dust collector 200 of FIGS. 6 and 7 provides a heavy duty, vacuum operated machine and vacuum loader to efficiently remove, effectively collect, and safely dispose of particulate matter, debris, and waste. The two compartment industrial dust collector 200 of FIGS. 6 and 7 is structurally and functionally substantially similar to the two compartment industrial dust collector 10 of FIGS. 1-4, except as discussed below.

In the two compartment industrial dust collector 200 of FIG. 6, the first compartment 202 comprising an upright solids-gas separation compartment has a lower cyclone chamber (cyclone stage) 204 which contains a tangential cyclone 206. The tangential cyclone 206 makes a gross cut and partially dedusts the dusty influent air and/or liquid. The tangential cyclone 206 is orientated and arranged to direct and blow the dusty air and/or liquid counterclockwise and generally opposite the direction of flow of the tangential cyclone 52 of FIG. 2, so that the dusty air and/or liquid flows downwardly through the solids gas separation compartment 202, laterally rearwardly through the upper portion of the bin or hopper 16, and upwardly through the second compartment 210 comprising an upright filtering compartment.

A horizontal air intake tube, conduit, or pipe 208 (FIG. 6) is connected to and feeds dusty influent air, i.e. air containing particulates of dust and other debris, into the tangential cyclone 206 as a result of the suction and negative vacuum pressure created by the vacuum suction pump 209. The vacuum pump 209 can comprise a air blower, fan, pneumatic pump, or compressor. For some types of dust, conditions, and where lower amounts of dust removal, efficiency, and expense are adequate, appropriate, and desirable, the solids gas separation compartment 204 need not have a baffle chamber (upper deflector stage) with helical, spiral, annular, or other baffles.

In the two compartment industrial dust collector 200 of FIG. 6, the second compartment 210 comprising the upright filtering compartment or filter compartment, is positioned along side and spaced laterally rearwardly and away from the first compartment 202 comprising the solids-gas separation compartment and in offset relationship thereto, as is the filtering compartment of FIGS. 1-4, rather than vertically above the solids-gas separation compartment. The open bottom portion 212 of the filtering compartment 210 provides an inlet opening for entrance of the partially dedusted stream of air and/or liquid from the tangential cyclone 206. The lower portion and annular outer portion of the filtering compartment provides an acceleration or kinetic chamber 214 which accelerates and/or passes the dusty air and/or liquid upwardly with sufficient kinetic energy to remove a substantial amount of particulates of dust from the dusty air and/or liquid before the dusty air and/or liquid enters and passes through the filter(s) in the filter chamber 215 of the filtering compartment 210.

The inner central portion of the filtering compartment (second compartment) 210 provides a filter chamber 215 and contains at least one filter to filter, dedust, and remove substantially all of the remaining particulates of dust in the upwardly flowing stream of dusty air and/or liquid in the filtering compartment 210. In the embodiment of FIGS. 6 and 7, there are a concentric set or series of four tubular filters (canister filters) 216–219 which are arranged similar and are structurally and functionally similar to the tubular filters (canister filters) 92, 94, 96, and 98 of the two compartment industrial dust collector 10 of FIG. 4. The filtering compartment 210 has a set or series of four air injectors 221–224 which are connected by compressed air lines or conduits to compressed air tanks 226–229 to sequentially inject intermittent pulses of air on the filters 216–219 to clean the filters. The air injectors 221–224 and compressed air tanks 226–229 are arranged similarly and are structurally and functionally similar to the air injectors 116–119 and compressed air tanks 122–125 of FIG. 4. In some circumstances, it may be desirable to use other types of filter cleaning equipment, such as mechanical shakers and vibrators, or more or less filters.

Figure 8:
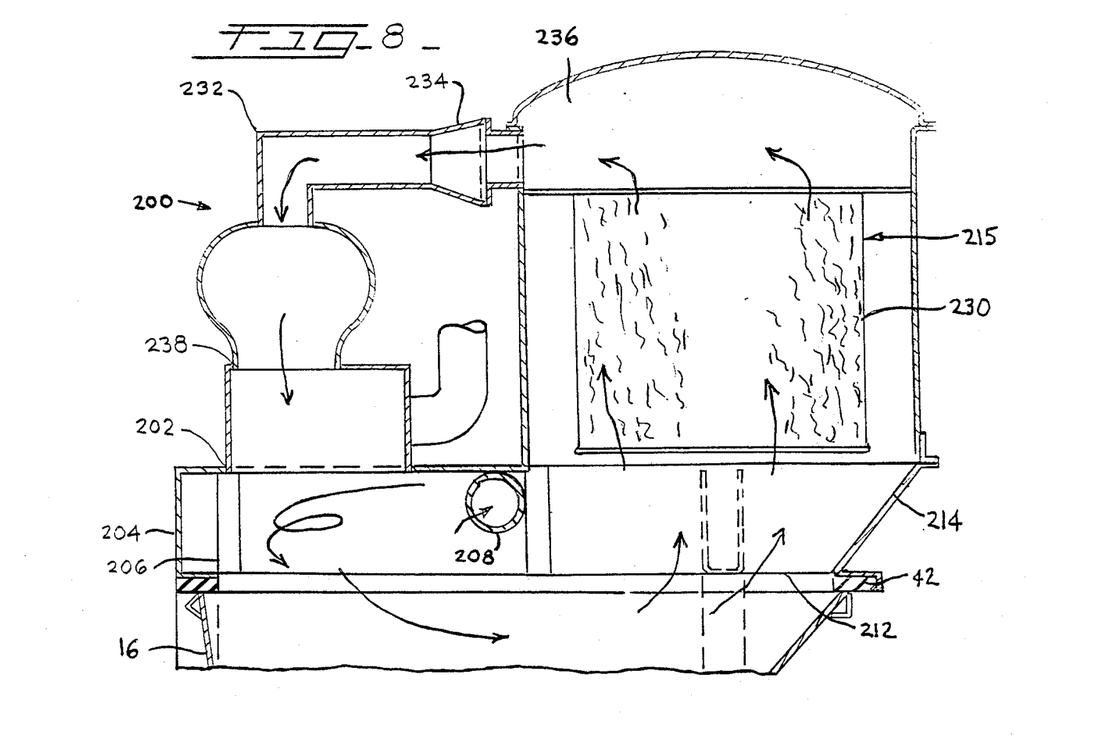
FIG. 8 is a fragmentary cross-sectional front view of another two compartment industrial dust collector in accordance with principles of the present invention.

As shown in FIG. 8, the filtering chamber (filter stage) 215 of the second compartment (filtering compartment) 210 can have a single Hepa-type filter or box type filter 230 instead of a set or series of tubular filters (canister filters). The Hepa-type filter or box type filter 230 substantially filters, dedusts, and removes substantially all of the remaining particulates of dust from the upwardly moving stream of dusty air and/or liquid in the filtering compartment 210. If desired, more than one Hepa-type filter or box type filter can be used. Other types of filters can also be used.

The dedusted purified air and/or liquid is withdrawn from the filtering compartment (second compartment) 210 (FIGS. 6 and 8) through an outlet discharge tube, conduit, or pipe 232, which has a frustoconical neck 234 and extends laterally between and connects the domed upper portion, clean air chamber or plenum 236 of the filtering compartment 210 and the upper portion (upper chamber) 238 of the solids-gas separation compartment (first compartment) 202. The dedusted purified air is discharged from the solids gas separation compartment 202 to the surrounding atmosphere via a muffler 240 (FIG. 7).

It has been unexpectedly and surprising found that in many situations the two compartment industrial dust collectors of FIGS. 6–8 were very good in removing a large amount of the particulates of dust.

Among the many advantages of the two compartment industrial dust collectors of FIGS. 1–8 are:
1. Improved removal of particulate matter, debris and waste.
2. Better solids-gas separation.
3. Enhanced air purification.
4. Excellent dedusting.
5. Greater efficiency of operation.
6. More economical to manufacture and operate.
7. Easy to use.
8. Effective.
9. Less pressure drop.
10. Quiet zone on bottom.
11. Lateral and/or upward flow of air into filters.
12. Easy to repair.
13. Less maintenance.

Although embodiments of the invention have been shown and described, it is to be understood that various modifications and substitutions, as well as rearrangements of parts, can be made by those skilled in the art without departing from the novel spirit and scope of this invention.

What is claimed is:

1. A two compartment industrial dust collector, comprising:
   a hopper comprising a bin;
   only two compartments positioned above said hopper including
   a first compartment comprising a solids-gas separation compartment with a lower cyclone chamber containing solids-gas separator means for removing larger particulates of dust from a dusty fluid stream;
   said solids-gas separator comprising a cyclone positioned and arranged in said lower cyclone chamber for downward flow of said dusty fluid stream through said first solids-gas separation compartment;
   inlet means connected to said solids-gas separating compartment for feeding said dusty fluid stream to said solids-gas separating compartment;
   suction means for drawing said dusty fluid stream through said inlet conduit into said filtering compartment;
   a second compartment comprising a filtering compartment positioned generally along side and spaced laterally away from said solids-gas separation compartment and in an offset relationship thereto, rather than in vertical alignment or above said solids-gas separation compartment, said filtering compartment having a filtering chamber containing at least one filter for filtering said dusty fluid stream, said filtering compartment having an open bottom portion defining an inlet opening for directing said dusty fluid stream upwardly through said filter; and
   said hopper communicating with and connected to said first solids-gas separation compartment and said second filtering compartment for laterally passing said dusty fluid stream from said first solids-gas separation compartment to said second filtering compartment.

2. A two compartment industrial dust collector in accordance with claim 1 wherein said filtering compartment has a set of tubular filters.

3. A two compartment industrial dust collector in accordance with claim 1 wherein said filter comprises a box filter.

4. A two compartment industrial dust collector in accordance with claim 1 wherein said filter comprises a Hepa-type filter.

5. A two compartment industrial dust collector in accordance with claim 2 including filter cleaning means comprising:
   compressed air tanks; and
   air injectors operatively connected to said compressed air tanks for sequentially injecting pulses of compressed air upon said set of tubular filters.

6. A two compartment industrial dust collector, comprising:
   a bin;
   a frame assembly providing a cradle for slidably receiving said bin, said frame assembly having a base, posts extending upwardly from said base, and a support platform secured to, positioned upon and extending laterally between said posts;
   only two compartments extending upwardly from and communicating with said bin including
   a solids-gas separation compartment having a lower cyclone chamber containing a tangential cyclone positioned above said bin for making a gross cut and partially dedusting a dust-laden stream of influent dusty air, said cyclone being positioned and orientated in said lower cyclone chamber for directing flow of said dust-laden stream of influent dusty air substantially downwardly through said solids-gas separation compartment;
   an inlet conduit connected to and communicating with said tangential cyclone;
   a vacuum pump selected from the group consisting of an air blower, fan, pneumatic pump, turbine, and compressor, mounted upon said support platform for drawing said influent dusty air through said inlet conduit into said tangential cyclone;
   a filter compartment extending substantially upwardly from said bin and communicating with said bin for receiving said partially dedusted stream of air from said cyclone via said bin, said filter compartment positioned generally along side and spaced laterally away from said solids-gas separation compartment and in an offset relationship thereto, rather than in vertical alignment or above said solids-gas separation compartment, said filter compartment having an upper domed portion and a central filtering chamber containing at least one filter for filtering said partially dedusted stream of air as said air moves upwardly to provide a substantially dedusted, upwardly flowing, purified stream of air, said filter compartment defining an open bottom portion providing an inlet opening for upward flow of said partially dedusted stream of air through said filter, and said filter compartment having a kinetic chamber comprising a lower portion positioned below said filter and an annular outer portion positioned annularly around said filter for passing said partially dedusted stream of air upwardly with sufficient kinetic energy to remove a substantial amount of particulates of dust from said partially dedusted stream of air before said partially dedusted stream of air passes through said filter;
   an outlet conduit comprising a discharge tube connected to and communicating with said domed upper portion of said filter compartment for discharging said purified air from said filter compartment into the atmosphere; and
   said bin having an upper portion communicating with and connected to said solids-gas separation compartment and said filter compartment for laterally passing said partially dedusted stream of air from said solids-gas separation compartment to said filter compartment.

7. A two compartment industrial dust collector in accordance with claim 6 wherein said filter compartment has a set of tubular filters.

8. A two compartment industrial dust collector in accordance with claim 7 including a set of injectors operatively connected to said filter chamber for periodically injecting intermittent blasts of air upon said filters to help clean said filters.

9. A two compartment industrial dust collector in accordance with claim 6 wherein said filter comprises a box type filter.

10. A two compartment industrial dust collector in accordance with claim 6 wherein said filter comprises a Hepa-type filter.

11. A two compartment industrial dust collector in accordance with claim 6 wherein said discharge tube has a frustroconical neck and said filter chamber has a substantially horizontal floor comprising a substantially horizontal normally closed discharge door positioned above said bin for discharging said removed dust.

* * * * *